United States Patent
Szabo

[19]

[11] Patent Number: 6,155,612
[45] Date of Patent: Dec. 5, 2000

[54] HYBRID QUICK CONNECTOR

[75] Inventor: George Szabo, Ortonville, Mich.

[73] Assignee: ITT Manufacturing Enterprises, Inc., Wilmington, Del.

[21] Appl. No.: 08/972,080

[22] Filed: Nov. 17, 1997

[51] Int. Cl.[7] .................................................. F16L 39/00
[52] U.S. Cl. ........................................... 285/319; 285/351
[58] Field of Search ................................... 285/305, 319, 285/351

[56] References Cited

U.S. PATENT DOCUMENTS

| | | | |
|---|---|---|---|
| 4,696,326 | 9/1987 | Sturgis | 137/614 |
| 5,395,140 | 3/1995 | Wiethorn | 285/305 |
| 5,542,712 | 8/1996 | Klinger et al. | 285/305 |
| 5,542,716 | 8/1996 | Szabo et al. | 285/305 |
| 5,568,946 | 10/1996 | Jackowski | 285/305 |
| 5,609,370 | 3/1997 | Szabo et al. . | |

FOREIGN PATENT DOCUMENTS 0 072 889  3/1983  European Pat. Off. .
0 096 475  12/1983  European Pat. Off. .

Primary Examiner—Anthony Knight
Assistant Examiner—Alison K. Pickard
Attorney, Agent, or Firm—Peter H. Van Winkle

[57] ABSTRACT

A Hybrid Quick Connector for releasably interconnecting fluid carrying tubular members has a housing with first and second portions which are joined together to establish a through passage for fluid communication of the tubular members. One housing portion defines a first bearing surface and a retainer for releasably engaging an end form of one of the members. The other housing portion is permanently affixed to the end form of the other member and defines a second bearing surface which is axially spaced from the first bearing surface to straddle a resilient seal. Upon insertion of the first tubing end form, a retainer locks it in assembly with the quick connector and the seal acts to block the only potential leak path. Preferably, the first housing portion is formed of injection molded thermoplastic and the second housing portion is formed of mild steel to ensure a robust and inexpensive connector configuration which is particularly well suited for automotive air conditioning and engine coolant system applications.

15 Claims, 4 Drawing Sheets

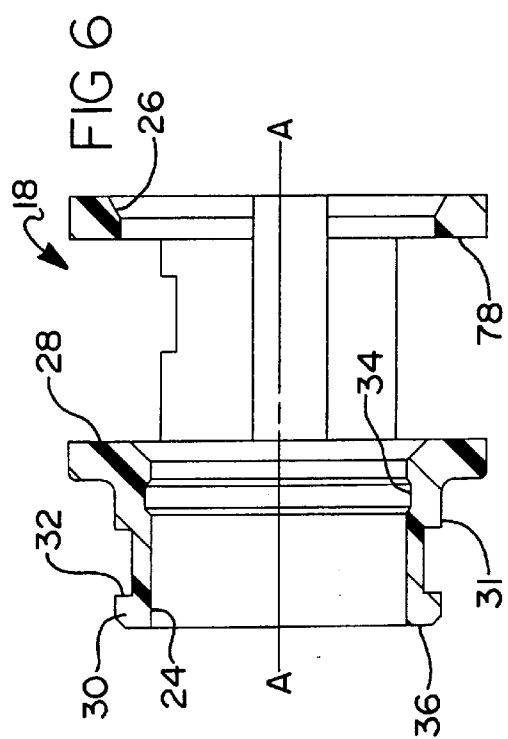
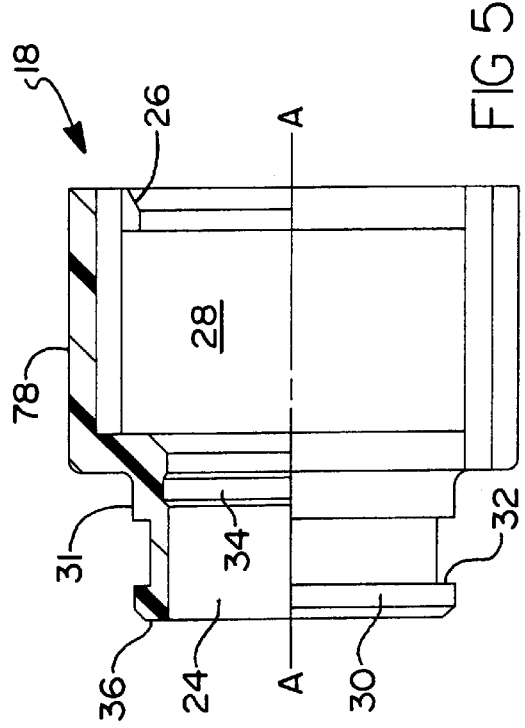
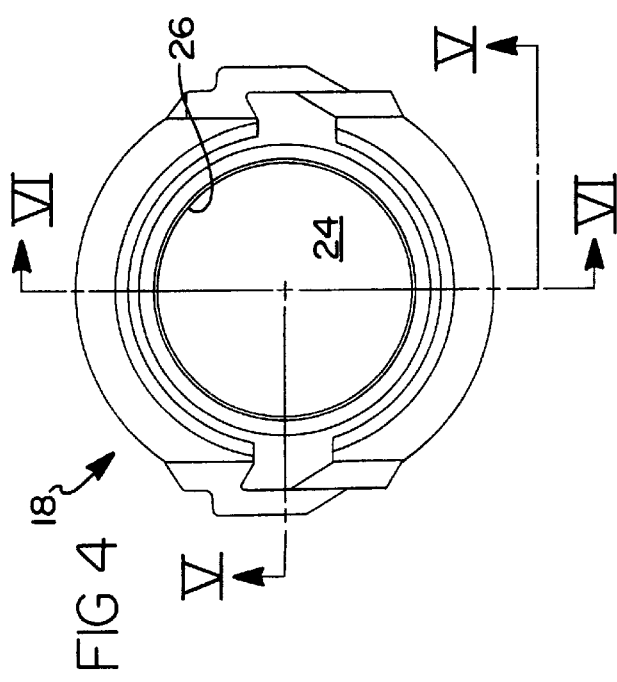
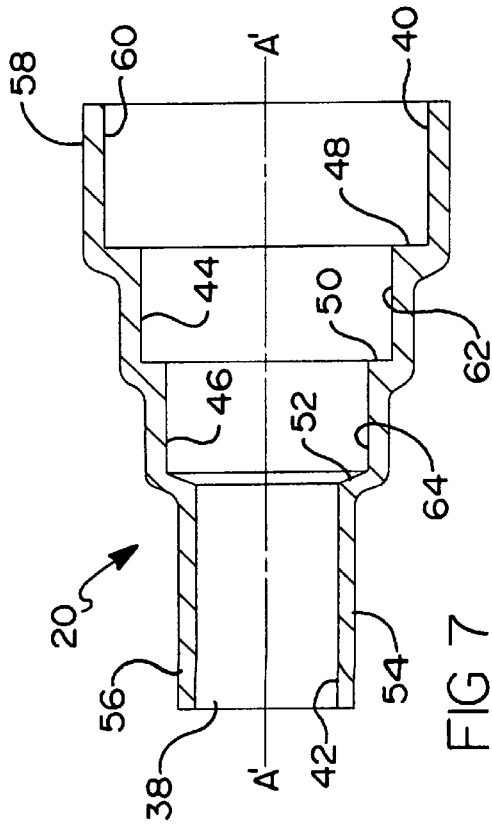

HYBRID QUICK CONNECTOR

CROSS-REFERENCE TO RELATED APPLICATIONS

The present invention is related to U.S. Pat. No. 5,542, 716, issued Aug. 6, 1996, entitled "Quick Connector With Snap-On Retainer" and U.S. patent application Ser. No. 08/839,155, filed Apr. 23, 1997 now U.S. Pat. No. 5,951, 063, issued Sep. 14, 1999 and, entitled "Quick Connector With Snap-On Retainer Having Enhanced Engagement" having the same Assignee of Interest as this application which are hereby incorporated within this specification by reference.

INTRODUCTION

The present invention relates to fluid connectors and, more particularly, to quick connectors which are employed in fluid conduit systems to facilitate assembly and disassembly and, more particularly still, quick connectors which are suitable for use in high pressure applications such as automotive air conditioning and engine cooling systems.

BACKGROUND OF THE INVENTION

Quick connect couplings have been widely used in the U.S. Automobile industry for many years. Although applicable in numerous applications, quick connectors are typically restricted to use in low-pressure applications such as fuel systems and vapor recovery systems. The simplest and most cost effective design is the plastic housing female type quick connector releasably mated to a metal male tube end form. The opposite end of the female housing most typically defines a stem having a number of axially spaced barbs formed on the outer circumferential surface thereof and a nylon or resilient plastic tubing end form pressed thereover. Such an arrangement is described in U.S. Pat. No. 5,542, 712, issued Aug. 6, 1996, entitled "Quick Connector Housing With Elongated Barb Design".

Although suitable for use in their intended applications, the aforementioned connectors have been limited to relatively low pressure automotive applications. Designers of higher pressure systems such as air conditioning and engine cooling typically resort to traditional threaded type connectors which are constructed of relatively expensive screw machine formed components that, in application, require special tools for final assembly within the host system. In high volume automotive applications, the use of such labor intensive, expensive fittings are viewed as a distinct competitive disadvantage.

In fluid handling systems, it is imperative that the connectors used have their male and female portions properly coupled together. A faulty connector enables an associated system to leak fluid. This can be particularly disadvantageous when the system is under pressure and the leaking connector expels the pressurized fluid. Furthermore, recent Federal Legislation has mandated the elimination of certain refrigerants used in automotive air conditioning systems as well as significantly reduced the level of permissible emissions from automotive engine cooling and lubrication systems. Conventional quick connectors, although effective to mechanically maintain tubing end forms in assembly with their associated connector bodies, have not adequately addressed the federal requirements. Also, the materials employed, typically glass filed nylon, do not provide sufficient resistance to the permeation or seepage of refrigerant or coolants therethrough.

The female body portion of quick connectors are typically formed in one piece of injection molded thermoplastic or metal. Although generally configured in tubular form, the female body portion tends to have numerous complex contours and features which can prove difficult to form and assemble during the manufacturing process.

Another disadvantage inherent in many current quick connector designs resides in the necessity to fully assemble the connector prior to mating with a tube to form a fluid tight joint. A related shortcoming stems from the fact that typical quick connectors form a barbed nipple at one end for insertion within the I.D. of a very resilient (rubber or plastic) tube to establish a first relatively permanent joint. Thereafter, a second, relatively rigid, male member is received within an opposite opening within the female assembly and releasably engaged by a retainer. This results in two potential leak paths being introduced into the system. That is, at the interface between the exterior peripheral surface of the nipple and the I.D. of the resilient tube and a second leak path between the outer peripheral surface of the male member and the inner diameter of the mating through passage of the female connector body.

Finally, designers typically must compromise between high strength and design flexibility. Having both has historically resulted in complex and expensive configurations. A related problem stems from dual aspects of commercially available quick connect devices to wit; high volume and low sale prices frequently necessitating the use of inexpensive, somewhat pliable materials, and complex contours of extremely small inter-fitting components. These aspects collectively increase the likelihood of misassembly. High volume production techniques, including automated assembly tends to aggravate the problem wherein misassembly or impermissible dimensional variations of the components is difficult to detect. Excessive dimensional tolerance stack-up can result in low pull-apart characteristics between the barbed stem and the plastic tube to produce leakage. Misassembly, such as failure to include an O-ring can also result in leakage. Finally, plastic tube with low hoop strength can relax over time or at elevated temperatures, resulting in leaking or weeping of fluid.

A further disadvantage of typical prior art quick connector assemblies resides in the fact that they are intended to establish a joint between a first relatively rigid (typically metal) tube end form and a second resilient (typically rubber or vinyl) tube end form. Such connectors are typically unsuitable for coupling two rigid (metal or hard plastic) tube end forms. Lastly, in the case of electrically conductive tube material, prior art quick connectors typically do not provide a reliable path of electrical conductivity through the connector.

BRIEF DESCRIPTION OF THE INVENTION

It is an object of the present invention to provide a simple and inexpensive yet mechanically and environmentally robust connection between a tube end form and a connector body as well as an assembly that overcomes the shortcomings of the prior art described hereinabove.

The present invention provides a quick connector having a two part housing. A first housing portion defines an opening which is adapted for receiving an elongated male member and a first through passage. A second housing portion defines a second through passage and is interconnected with the first housing portion at a joint which aligns the two passages. The quick connector further includes retainer means adapted to releasably interconnect the first housing portion with the male member and means disposed within the second housing portion adapted to effect sealing engagement between an outer circumferential surface of the male member and an inner circumferential surface of the second through passage. This arrangement has the advantage of a robust design which allows manufacturing flexibility wherein one of the housing portions can be preassembled with its mating tube prior to joining of the two housing portions.

In the preferred embodiment of the invention, the first housing portion of the quick connector includes a first bearing surface within the first through passage which is adapted for slip-fit engagement with the male member outer circumferential surface. Furthermore, the second housing portion includes a second bearing surface within the second through passage which is adapted for slip-fit engagement with the male member outer circumferential surface. The first and second bearing surfaces are axially spaced to ensure a robust design and intimate contact between the leading end of the male member and the second housing portion.

In the preferred embodiment of the invention, the sealing means includes a pair of O-rings disposed within the through passage of the second housing portion to ensure a fluid tight seal between the outer peripheral surface of the male member and the inner peripheral surface of the second through passage. This arrangement has the advantage of providing a two piece connector body employing simple and inexpensive seal means, blocking the only possible leak-path within the assembly. It is noted that the excessive complexity of some prior art quick connector configurations resulted in multiple leak paths and thus enhanced likelihood of leakage failures.

According to another aspect of the invention, the first and second housing portions are formed of dissimilar materials. This has the advantage of permitting a designer to select a material for one body portion having a first set of characteristics (such as strength, structural integrity, electrical conductivity and the like) and a different material for the other housing portion based on a different set of characteristics (such as low cost, form ability and the like).

According to another aspect of the invention, the joint (between the first and second housing portions) is located generally axially adjacent the first bearing surface and includes material of said second housing portion which has been plastically deformed radially into a mating recess formed in the first housing portion. This arrangement has the advantage of permitting relatively simple and inexpensive joining of the two housing portions to ensure high structural integrity therebetween while isolating such joining process from the seal.

According to yet another feature of the invention, the second housing portion includes an axially extending flange integrally formed therewith which is adapted for fluid tight interconnection with a conduit. This arrangement provides for the flexibility of selecting identical materials for the conduit and the second housing portion as well as the possibility of preassembling the two prior to assembly of the quick connector. This permits the use of brasing or other joining techniques that would otherwise be unsuitable for connector components with low melting temperatures.

According to still another feature of the present invention, the second body portion can be integrally formed with its mating tubing to totally eliminate the second joint, thereby further reducing costs and enhancing overall reliability.

These and other features and advantages of this invention will become apparent upon reading the following specification which, along with the drawings, describes and discloses preferred and alternative embodiments of the invention in detail.

A detailed description of the disclosed embodiments makes reference to the accompanying drawings.

BRIEF DESCRIPTION OF THE DRAWINGS

FIG. 4, is an end view of the first housing portion of the quick connector illustrated in FIGS. 1 through 3;

FIG. 5, is a partial, cross-sectional view, taken on lines V—V of FIG. 4;

FIG. 6, is a cross-sectional view, taken on lines VI—VI of FIG. 4;

FIG. 7, is a cross-sectional view of the second housing portion of the preferred embodiment of the quick connector illustrated in FIGS. 1 through 3.

DETAILED DESCRIPTION OF THE PREFERRED AND ALTERNATIVE EMBODIMENTS

Figure 1:
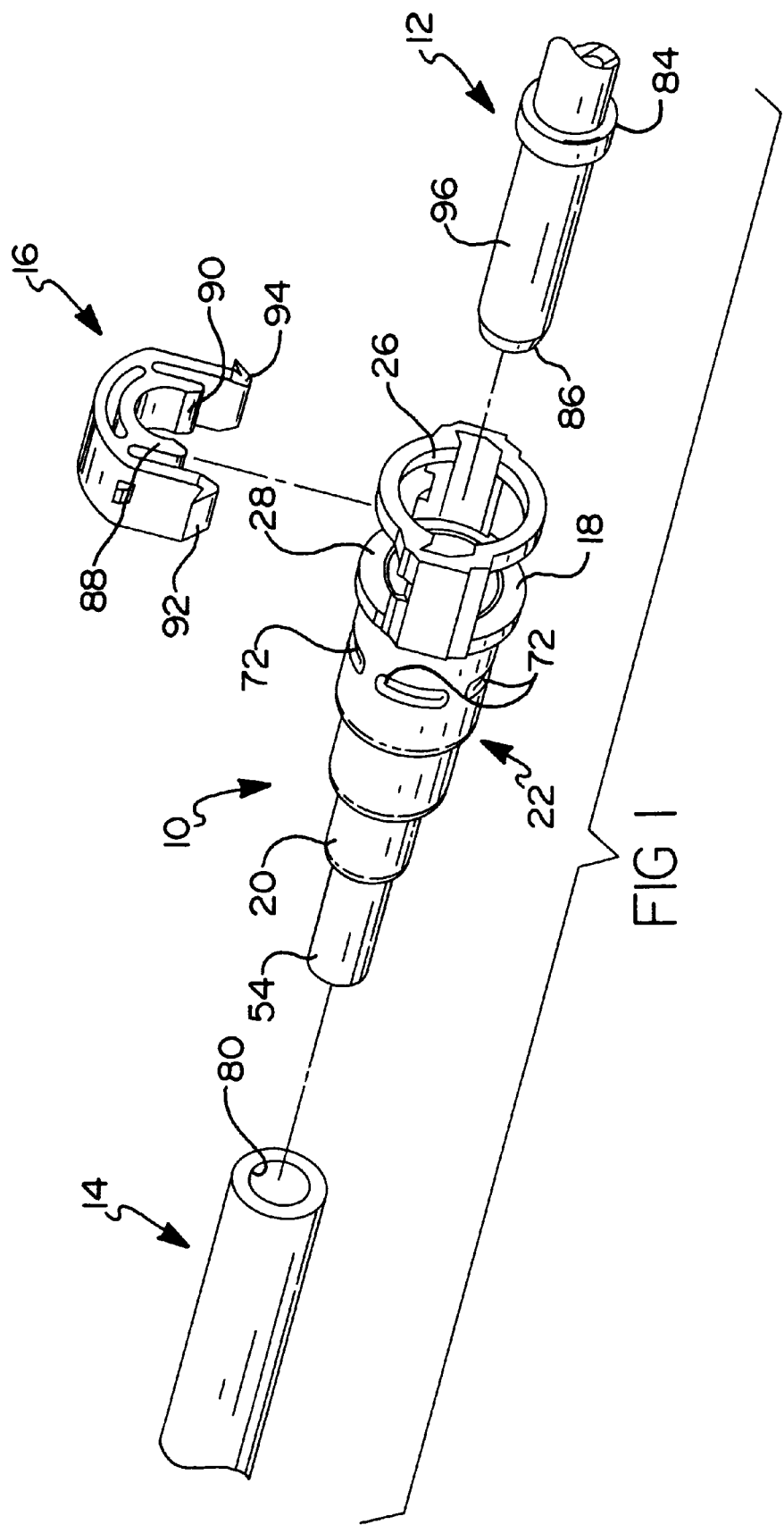
FIG. 1, is an exploded perspective view of a quick connector embodying the present invention in application with two tubing end forms.
Figures 2, 3:
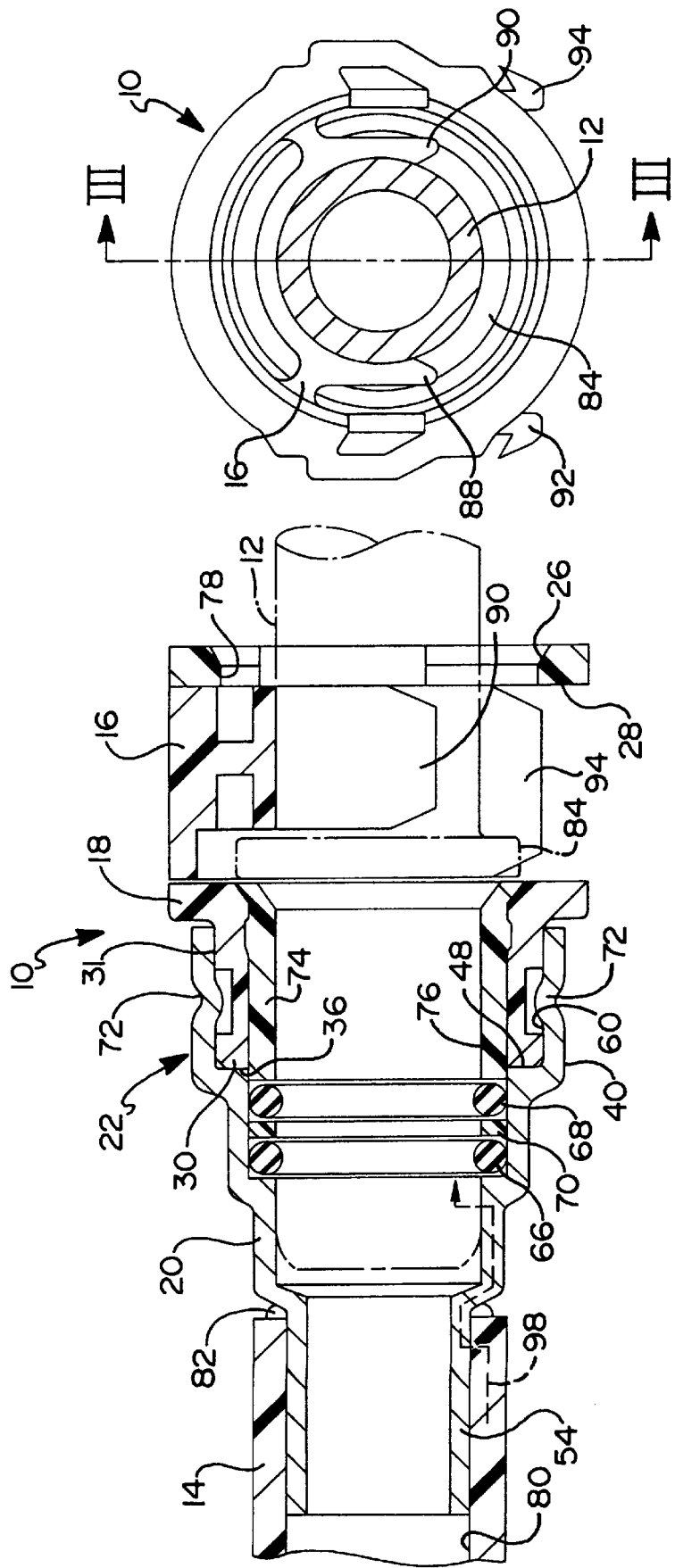
FIG. 2, is an end view, on an enlarged scale, of the preferred embodiment of the present invention in application as illustrated in FIG. 1.
FIG. 3, is a cross-sectional view, taken on lines III—III of FIG. 2.

Referring to FIGS. 1–3, the preferred embodiment of the present invention is illustrated in a quick connector 10 is employed in its intended application in assembly with a male member or tubing end form 12 and a second tube end form 14. Quick connector 10 serves to join or mechanically interconnect tubes 12 and 14 to provide a fluid-tight interconnection therebetween. A retainer 16 serves to releasably interconnect quick connector 10 with male member 12 to facilitate final assemble in a host system such as an automobile air conditioning or engine coolant handling system and/or for subsequent repair and servicing thereof. Although the present invention can be applied to many different fluid handling systems, it will be described herein in the context of an automotive air conditioning system as an example only.

Quick connector 10 has a two part body or housing consisting of a first housing portion 18 and a second housing portion 20 which are mechanically interconnected at a joint, generally designated 22.

Referring to FIGS. 4–6, the detailed structure of first housing portion 18 is illustrated. Housing portion 18 is preferably constructed of injection molded thermoplastic material formed in a generally cylindrical configuration defining a passageway 24 extending therethrough concentric about an axis designated A—A. First through passage 24 terminates at one end at an opening 26 which, in application, is adapted for receiving the leading end 86 of male member 12. A generally rectangular transverse passage 28 intersects through passage 24 receiving retainer 16 therein.

The end of first housing portion 18 opposite opening 26 terminates in a cylindrical flange 30. Flange 30 has a radially outwardly opening circumferential recess or groove 32 formed on the outward most surface thereof and a radial upset 34 formed on the I.D. surface thereof to secure an insert bearing (not shown) therein. The left hand most end (as viewed in FIGS. 5 and 6) of flange 30 defines an abutment surface 36.

Referring to FIG. 7, the structural details of second housing portion 20 are illustrated. Second housing portion 20 is preferably formed of mild steel which has been expanded or machined to assume the configuration shown. However, it is anticipated that other suitable materials, such as aluminum, could be employed. Preferably, second housing portion 20 is constructed of the same material as tube end forms 12 and 14.

Second housing portion 20 is constructed in a generally cylindrical configuration symmetrical about an axis A'—A' to define a second through passage 38. Second through passage 38 is a stepped bore made up of a large diameter portion 40 at one end thereof, a small diameter portion 42 at the opposite end thereof and first and second intermediate diameter portions 44 and 46, respectively, therebetween. A step 48 defines the radial transition between first intermediate diameter portion 44 and large diameter portion 44. Likewise, a step 50 defines the point of radial transition between second intermediate diameter portion 46 and first intermediate diameter portion 44, and step 52 defines the point of radial transition between small diameter portion 42 and second intermediate diameter portion 46. The left hand end (as viewed in FIG. 7) of second housing portion 20 defining small diameter portion 42 is formed as a cylindrical flange or skirt 54 defining a cylindrical outer diameter surface 56 thereon. Likewise, the right hand most end of second housing portion 20 is configured as a cylinder defining an outer diameter surface 58 and an inner diameter surface 60. First and second intermediate diameter portions 44 and 46, respectively, each define a I.D. surface, 62 and 64, respectively, which are disposed substantially concentrically about axis A'—A'.

Referring to FIG. 3, quick connector 10 can be preassembled by first inserting a seal pack consisting of first and second O-rings, 66 and 68, respectively and an intermediate nylon spacer 70 in a slip-fit within first intermediate diameter portion 44 of second housing portion 20. Flange 30 of first housing portion 18 is axially inserted within large diameter portion 40 of second housing portion 20 bringing their axes A—A and A'—A' into substantial alignment. When installed, abutment surface 36 of flange 30 will abut step 48 of second housing portion 20.

The I.D. surface 60 of large diameter portion 40 and the O.D. surface 31 of flange 30 constitute joint 22. Housing portions 18 and 20 are permanently interconnected through joint 22 by suitable means such as adhesives, welding or mechanical interconnection. FIG. 3 illustrates the last of said methodologies in which the metal of large diameter portion 40 is plastically deformed radially inwardly in a region adjacent groove 32 to effect a mechanical interlock therebetween. The deformation 72 can be circumferentially continuous, localized or segmented (as illustrated in FIG. 1), with the effect that the housing portions 18 and 20 are securely interconnected. Crimping or swedging radially inwardly is preferred. However, it is contemplated that radially outward crimping or other suitable manufacturing process can be substituted.

A cylindrical top hat or bearing 74 is axially press fit within the I.D. surface of flange 30 with a slight interference fit to engage radial upset 34 and remain in the position illustrated in FIG. 3.

Top hat 74 is constructed of nylon or other suitable material and defines a bearing surface 76 on the inner diameter surface thereof. Definitionally, the right hand most end (as viewed in FIGS. 5 and 6) of first housing portion 18 is defined as a large diameter portion 78 and bearing surface 76 constitutes a small diameter portion of first housing portion 18. Transverse passage 28 extends through large diameter portion 78 of first housing portion 18.

Referring to FIGS. 1 and 3, in application, quick connector 10 is permanently coupled with the open end of tube end form 14 by insertion of cylindrical flange 54 within the I.D. surface 80 of tube end form 14 and sealingly affixing the two such as by welding 82.

Quick connector 10 is joined with male member 12 by insertion of member 12 axially into opening 26 until the leading edge of an upset bead 84 formed on male member 12 at a spaced axial distance from its leading end 86 abuts the right hand most surface (as viewed in FIG. 3) of top hat 74 as illustrated in phantom. Male member 12 is retained in its illustrated position by the radial insertion of the generally U-shaped retainer 16 through transverse passage 28. Retainer 16 is dimensioned to form a slip-fit within passage 28 and includes resilient fingers 88 and 90 which, upon installation, embrace the outer circumferential surface of male member 12 at an axial location adjacent upset bead 84 opposite leading end 86. Resilient tabs 92 and 94 formed on retainer 16 engage mating surfaces on first housing portion 18 to prevent inadvertent radial movement of retainer 16.

If desired, retainer 16 can be removed by squeezing tabs 92, 94 together and simultaneously pushing retainer 16 upwardly (as viewed in FIG. 2) until resilient fingers 88 and 90 fully release male member 12. Thereafter, male member 12 can be axially removed from quick connector 10. Although various commercially available retainers could be employed, the illustrated retainer is viewed as particularly advantageous for its low cost and high pull apart strength properties. This type of retainer is described in greater detail in U.S. Pat. Nos. 5,542,716 and 5,951,063, which are owned by the Assignee of Record of the present invention and which are incorporated herein by reference.

The outer peripheral surface 96 of male member 12 is dimensioned for a close tolerance slip-fit within both bearing surface 76 of top hat 74 and I.D. surface 64 of second intermediate diameter portion 46 of second housing portion 20, both of which constitute bearing surfaces which are axially spaced from one another and straddle the resilient O-ring seals 66 and 68. This structure ensures that the redundant O-rings 66 and 68 block the only possible leak path through joint 22 and that joint 22 can be mechanically formed to relatively imprecise tolerances without concern for effecting the leakage characteristics of quick connector 10. Inasmuch as second housing portion 20, and tube end forms 12 and 14 are all constructed of electrically conductive metallic materials, a reliable electrically conductive path shown generally at 98 is assured due to the intimate contact between I.D. surface 80 of tube end form 14 with O.D. surface 56 of second housing portion 20 as well as I.D. surface 64 of second housing portion 20 and the outer peripheral surface 96 of male member 12. This permits the elimination of undesirable accumulated static electrical charge generated by flow of fluid through the host system.

Figure 8:
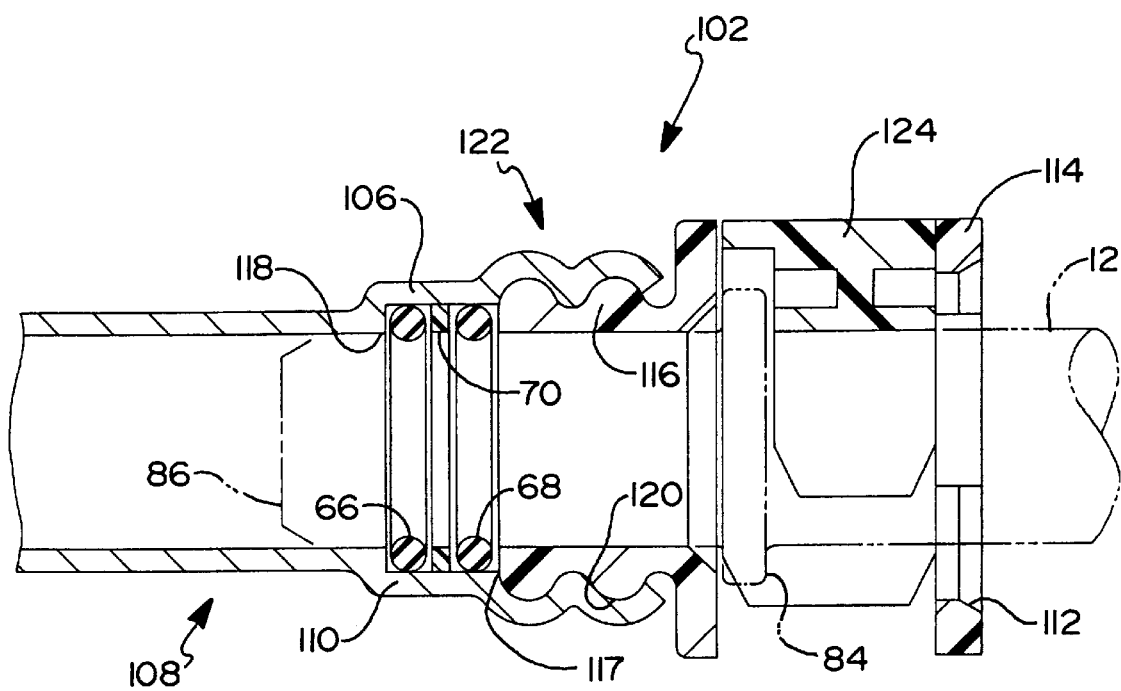
FIG. 8, is a cross-sectional view of an alternative embodiment of the present invention in application.

Referring to FIG. 8, an alternative embodiment of the present invention is illustrated with a quick connector 102 which is essentially configured and operates as described with regard to the preferred embodiment of the invention with the exception of the following. Quick connector 102 has a first housing portion 104 and a second housing portion 106. Second housing portion 106 is integrally formed from the open end of a metal tube end form, shown generally at 108, to form a region of increased inner diameter 110.

First housing portion 104 is formed of injection molded thermoplastic material and has a steaped through passage 112 extending therethrough having a large diameter portion 114 and a small diameter portion 116. Small diameter portion 116 is slip-fit within the open end of the area of increased diameter 110 of tube end form 108. O-rings 66 and 68 and intermediate spacer 70 are retained in their illustrated position between a step 118 formed at the point of transition between tube end form 108 and area of increased inner diameter 110 on one side and the left hand most end 117 of small diameter portion 116 of first housing portion 104 on the other side. The outer diameter surface 120 of small diameter portion 116 has radially extending circumferential undulations or other suitable contours formed therein for engaging the I.D. surface of the area of increased inner-diameter 110 of tube end form 108 when it has been crimped or swedged as illustrated.

The inner diameter of small diameter portion as well as the inner diamete tube end form 108 is dimensioned to permit a slip-fit of the outer circumferential surface of male member 12 therethrough and constitute bearing surfaces therefore. As in the case of the preferred embodiment of the invention, O-rings 66 and 68 are state to ensure that the only potential leak path through joint 122 is effectively blocked. The alternative embodiment totally eliminates the necessity of weldment 82 and the need to join tube end form 14 with a separate small diameter portion 42 (as described with respect to the preferred embodiment of the invention). Furthermore, the top hat has been eliminated. The retainer 124 is constructed and operates as described hereinabove.

It is to be understood that the invention has been described with reference to specific embodiments and variations to provide the features and advantages previously described and that the embodiments are susceptible of modifications as will be apparent to those skilled in the art. Accordingly, the foregoing is not to be construed in a limiting sense.

The invention has been described in an illustrative manner, and it is to be understood that the terminology which has been used is intended to be in the nature of words of description rather than limitation. Obviously, many modifications and variance of the present invention are possible in light of above teachings. It is, therefor, to be understood that within the scope of the appended claims wherein reference numerals are merely for convenience and are not to be in any way limited, the invention may be practiced otherwise than as specifically described.

What is claimed:

1. A quick connector adapted for releasably engaging an elongated male member comprising:
    a first housing portion defining an opening adapted for receiving said male member having a male member outer circumferential surface and a first through passage, said first housing portion including a first anular bearing surface within said first through passage adapted for slip-fit engagement with said male member outer circumferential surface to non-movably, radially support and center said male member in said first housing;
    a second housing portion defining a second through passage, said second housing portion including a second annular bearing surface within said second through passage adapted for slip-fit engagement with said male member outer circumferential surface to non-movably, radially support and center said male member to said second housing;
    said first and second housing portions interconnected at a joint aligning said first and second through passages;
    retainer means, independent of said first bearing surface, adapted to releasably interconnect said first housing portion and said male member;
    sealing means disposed within said second housing portion adapted to effect sealing engagement between said male member outer circumferential surface and an inner circumferential surface of said second through passage; and wherein:
        said first and second bearing surfaces are axially spaced and straddle said sealing means, said sealing means sealing said second through passage from said joint between said first and second housing portions.

2. The quick connector of claim 1, wherein said joint is disposed generally axially adjacent said first bearing surface.

3. The quick connector of claim 1, wherein said joint extends circumferentially about said housing portions.

4. The quick connector of claim 1, wherein said first and second housing portions define radially extending surface contours which cooperate to mechanically couple said housing portions at said joint.

5. The quick connector of claim 4, wherein one of said housing portions is formed of thermoplastic material and the other of said housing portions is formal from metal.

6. The quick connector of claim 1, wherein said first and second housing portions are constructed of dissimilar materials.

7. The quick connector of claim 6, wherein said first housing portion is formed of thermoplastic material and said second housing portions is formed of metal.

8. The quick connector of claim 1, wherein said second housing portion includes extension means adapted for fluid tight interconnection with a conduit.

9. The quick connector of claim 8, wherein said extension means comprises an axially extending flange.

10. The quick connector of claim 9, wherein a cylindrical surface of said flange is mechanically connected to a mating cylindrical surface of said conduit.

11. The quick connector of claim 10, wherein said mechanical interconnection is effected by welding.

12. The quick connectors of claim 10, wherein said flange is integrally formed with said conduit.

13. A quick connector adapted for releasably engaging an elongated male member comprising:
    a first housing portion defining an opening adapted for receiving said male member and a first through passage;
    a second housing portion defining a second through passage;
    said first and second housing portions interconnected at a joint aligning said first and second through passages, said joint including material of said second housing portion plastically deformed radially into a mating recess formed in said first housing portion
    retainer means adapted to releasably interconnect said first housing portion and said male member; and
    means disposed within said second housing portion adapted to effect sealing engagement between an outer circumferential surface of said male member and an inner circumferential surface of said second through passage.

14. A quick connector assembly comprising:
    an elongated male member having a male member outer circumferential surface;
    a female member including a first housing portion defining an opening for receiving said male member and a first through passage, said first housing portion including a first annular bearing surface within said first through passage adapted for slip-fit engagement with said male member outer circumferential surface to non-movably, radially support and center said male member in said first housing;

a second housing portion defining a second through passage, said second housing portion including a second annular bearing surface within said second through passage adapted for slip-fit engagement with said male member outer circumferential surface; to non-movably, radially support and center said male member to said second housing said first and second housing portions interconnected at a joint aligning said first and second through passages;

retainer means, independent of said first bearing surface, operative to releasably interconnect said first housing portion and said male member; and sealing means disposed within said second housing portion to effect sealing engagement between said male member outer circumferential surface and an inner circumferential surface of second through passage, said first and second bearing surfaces axially spaced and straddling said sealing means, with said sealing means sealing said second through passage from said joint between said first and second housing portions.

15. A hybrid quick connector assembly comprising:

an elongated generally tubular male member defining a radially extending abutment surface disposed adjacent an open end thereof, said male member having a male member outer circumferential surface;

a female member including a first housing portion defining an axial opening for receiving the open end of said male member, a first stepped through passage having a large diameter portion and a small diameter portion, and a first annular bearing surface within said small diameter portion of said first through passage adapted for slip-fit engagement with said male member outer circumferential surface;

a second housing portion defining a second stepped through passage having a large diameter portion, a small diameter portion and an intermediate diameter portion, said second housing portion including a second annular bearing surface within said small diameter portion of said second through passage adapted for slip-fit engagement with said male member outer circumferential surface;

said first and second housing portions mechanically interconnected at a joint axially aligning said first and second through passages wherein the small diameter portion of said first housing portion is disposed within the large diameter portion of said second housing portion and one of said housing portions radially locally deformed to establish said joint;

separate retainer means operative to releasably interconnect said first housing portion and said male member by engaging said male member abutment surface to limit relative axial movement therebetween; and sealing means disposed within said second housing portion to effect sealing engagement between said male member outer circumferential surface and an inner circumferential surface of the intermediate diameter portion of said second housing portion, said first and second bearing surfaces axially spaced and straddling said sealings means, with said sealing means sealing said second through passage from said joint between said first and second housing portions.

* * * * *